United States Patent [19]

Stewart

[11] 4,140,049
[45] Feb. 20, 1979

[54] METHOD AND APPARATUS FOR USING A FOOD COOKER AS A FOOD SMOKER

[76] Inventor: William G. Stewart, 6190 Hardy Dr., McLean, Va. 22101

[21] Appl. No.: 785,189

[22] Filed: Apr. 6, 1977

[51] Int. Cl.² .............................................. A23C 3/02
[52] U.S. Cl. .................................. 99/483; 126/25 R
[58] Field of Search ............... 99/340, 446, 467, 482, 99/483, 419; 126/25 R, 25 A

[56] References Cited

U.S. PATENT DOCUMENTS

| | | | |
|---|---|---|---|
| 2,515,521 | 7/1950 | Loffredo | 99/340 |
| 3,088,393 | 5/1963 | Huckabee | 126/25 A |
| 4,020,322 | 4/1977 | Muse | 99/482 |

Primary Examiner—Leonard D. Christian
Attorney, Agent, or Firm—Charles M. Leedom; Daniel W. Sixbey; Stuart J. Friedman

[57] ABSTRACT

Apparatus for converting an enclosable food cooker having a food supporting surface into a food smoker which can be advantageously used to smoke food at a very slow rate without significant dehydration or loss of natural juices. The apparatus includes an open topped container or pan containing a water filled, heat absorption cavity and suspension means, such as upstanding hooks, for detachably suspending the container or pan from the food supporting surface. A method for employing the apparatus in a conventional home charcoal grill is disclosed.

11 Claims, 10 Drawing Figures

METHOD AND APPARATUS FOR USING A FOOD COOKER AS A FOOD SMOKER

BACKGROUND OF THE INVENTION

1. Field of the Invention

This invention relates to food smoking apparatus and more particularly to an apparatus for converting an enclosable food cooker having a food supporting surface into a food smoker.

2. Description of the Prior Art

It is notoriously well known that when certain types of food such as fish or meat are subjected to a smoke filled environment for a lengthy period of time, a tasteful aromatic flavor is imparted to the food which cannot be accurately immitated by the application of any known combination of food seasonings. Unfortunately, known food smoking apparatus suffer from numerous inadequacies including not only bulk and complexity but also substantial initial equipment expense. One solution for the consumer is to purchase pre-smoked food. This solution, however, leaves the consumer unable to control either the strength of the smoked flavor imparted to the food or the flavor subtleties produced by selecting the type of smoke in which the food is treated. A further drawback to the purchase of pre-smoked food is the greater cost (sometimes substantial) as compared to the cost of the same food sold in an unsmoked form. Accordingly, there is a need for apparatus which the consumer can purchase inexpensively and use to smoke his own food.

One attempt to meet this demand is disclosed in U.S. Pat. No. 3,333,526 wherein a smoker is illustrated including a specialized container within which a drip catching tray is supported between smoke producing material and a food supporting rack. However, temperatures in excess of the optimal food smoking temperature may result in this type of device, whereby the smoked food may become overcooked and/or excessively dehydrated.

In U.S. Pat. No. 3,583,307 another smoker design is disclosed which attempts to solve the dehydration problem by supplying the smoke under high pressure to quickly drive the smoke into the food before the intense heat present in the vessel has had a chance to dry out the food. While devices of this type may solve the problem of food dehydration, the rapid smoke drive-in deprives the food of the full natural smoke flavor which results from a slower smoking process. Moreover, this high vapor pressure process requires a special pressure tight heavy walled container which significantly adds to the initial equipment cost.

Consumer demand for foods having a smoked flavor may explain, in large measure, the popularity of conventional back-yard grills. Food cooked on such grills retain a partially smoked flavor but the strength of such flavor cannot generally be controlled since the cooking time controls the time during which the food is subjected to smoke treatment. Many charcoal grills are manufactured to be substantially fully enclosable and could thus serve to concentrate smoke from smoke emitting materials placed on top of the ignited charcoal. However, when substantially fully enclosed, such grills tend not only to retain smoke but also to retain and concentrate the heat emitted by the ignited charcoal thus resulting in dehydrating and/or overcooking of the food. A need, therefore, exists for a simple, inexpensive apparatus which a consumer can use to prepare smoked food at home in accordance with his own preference for strength and subtleties of flavor.

SUMMARY OF THE INVENTION

It is therefore a primary object of this invention to provide an inexpensive apparatus for converting an enclosable food cooker, such as a charcoal grill having a food supporting surface, into a food smoker which can be advantageously used to smoke food at a very slow rate without significant dehydration or loss of natural juices from the food. More particularly, the disclosed apparatus includes heat absorption means for reducing the normal cooking rate of food placed within the food cooker while also providing added moisture to the space surrounding the food. Detachable suspension means are also provided for detachably suspending the heat absorption means from the food supporting surface beneath the food which is being smoked.

In one preferred embodiment the heat absorption means includes a pan-like structure or heat absorption cavity dimensioned to fit easily within one portion of the space beneath the food supporting surface of the enclosable food cooker. The detachable suspension means may take any one of a variety of possible forms including rigid hooks, spring biased clamps, or multi-position connectors as described more fully below.

It is a further object of this invention to provide means to detachably suspend the heat absorption cavity at a distance from the food which may vary with the amount of water contained within the cavity.

Still another object of this invention is to provide means to detachably suspend the heat absorption cavity in such a manner as to permit insertion and removal in an effortless and simplistic manner.

Another object of this invention is to provide a method for use with an enclosable food cooker, such as a charcoal grill having an enclosing door or lid, such that the cooker can be used to smoke food as follows: Charcoal is placed in the grill carefully confined to one corner or side portion of the charcoal holding section of the grill. The heat absorption cavity of the invention is suspended from the food supporting surface as far as possible from the charcoal using the suspension means of the invention after which the heat absorption cavity is filled with water. Upon ignition of the charcoal, smoke producing material, such as water soaked hardwood or fruitwood pieces, are spread thereon and food is placed on the food supporting surface directly above the water filled cavity. When the grill lid or door is closed, heat begins to spread within the enclosed grill but the water filled heat absorption cavity simultaneously begins to absorb some of this heat energy causing the water temperature to rise. Absorption of heat by the cavity retards temperature increase within the cooker especially in the vicinity of the food without reducing the concentration of smoke. The boiling temperature of water places an upper level on the temperature to which the heat absorption cavity may rise and, thus, so long as water remains in the cavity, the surrounding atmospheric temperature of the cavity will be forced to stablize at a relatively low value. Since the food placed immediately above the heat absorption cavity shares a considerable portion of this same atmosphere, the temperature of the food will also be maintained relatively low. The use of water within the heat absorption means provides yet another advantage, namely vapor from the water, including any vaporized natural juices which may have dripped from the food, will rise and surround the food resulting in minimal dehydration and enhanced flavor.

These and other objects, features and advantages of the invention will be better understood by reference to the following detailed description taken in conjunction with the accompanying drawings.

DETAILED DESCRIPTION OF THE INVENTION

Figure 1:
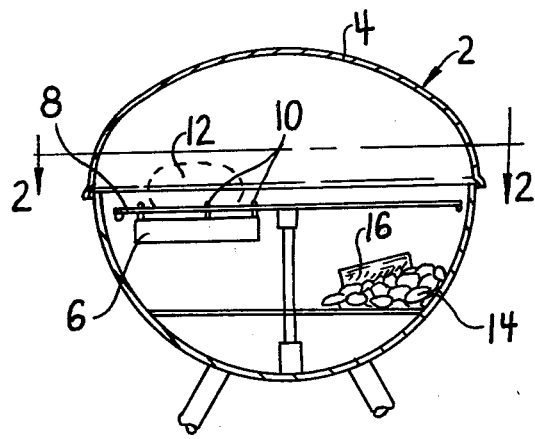
FIG. 1 is a cross sectional view of one embodiment of the invention for converting an enclosable food cooker into a food smoker.

With reference now to FIG. 1, an enclosable food cooker 2 is shown with the cover 4 closed. Although the illustrated enclosable food cooker 2 is illustrated as having a spherical shape such as the well known type of charcoal grill sold under the trademark WEBER COOKER, the conversion apparatus of this invention will work equally well in enclosable food cookers having other designs. The only critical feature of the cooker is that it be of the enclosable type i.e., that it have a cover or door capable of substantially enclosing an inner cavity within which the food may be supported.

The heat absorption cavity means of the invention is illustrated as a pan-like structure or heat absorption cavity 6 suspended from the food supporting surface grill 8 of the enclosable food cooker 2 utilizing a plurality of detachable suspension means or connectors 10. Both the heat absorption cavity 6 and the detachable connectors 10 will be described in greater detail below. However, in order to gain a greater understanding of the invention, the method by which this extremely simple structure may be used to transform a conventional enclosable food cooker 2 into a device suitable to smoke meats, fish or any other types of food will be discussed. Initially the heat absorption cavity may be suspended beneath the food supporting surface or grill 8 while the surface or grill is removed from the rest of the cooker. Charcoal 14 is next placed in the charcoal holding section 15 of the grill carefully confined to one corner or side portion of section 15 as far as possible from the heat absorption cavity 6. After the charcoal is ignited, smoke producing materials 16 are placed on top of the charcoal. The smoke producing material 16 may be pieces of fruitwood, hardwood or other woods or materials which provide aromatic smoke when heated. It has been found that pre-soaking of these materials in water will increase their smoke producing abilities. As the major purpose of the hot charcoals is to heat the smoke producing material 16 to the point where the material emits smoke, other heat producing methods such as the use of a gas burner or electrical resistive heating element may be used. Finally, the combined heat absorption cavity 6 and grill 8 is inserted into the cooker 2; the food 12 to be smoked is placed on the grill 8 immediately above the heat absorption cavity 6; and the cover 4 is used to fully enclose the food, charcoal and smoke emitting materials.

During the food smoking process, the temperature of the atmosphere immediately surrounding the food 12 is lower than the temperatures found elsewhere within the enclosable food cooker. This temperature differential is due to the thermal equilibrium balance between the intense heat produced by the ignited charcoal 14 and the much lower maximum temperature of the water in the heat absorption cavity 6. To maintain this thermal equilibrium, the heat absorption cavity 6 continually absorbs heat from its immediate surrounding atmosphere and passes it on to the water which then slowly boils off. Hence, so long as water remains in the heat absorption cavity 6, the surrounding atmosphere will be cooled. By placing the food immediately above the cavity 6, the temperature of the food will also be maintained at a relatively lower point.

Although not shown in FIG. 1, the vapor from the boiling water, including vaporized portions of the natural juices which have dripped from the food 12 during smoking, rises and surrounds the food. It is this combination of a low temperature atmosphere and of aromatic smoke and vaporized water and natural juices which permits smoking of the food 12 for a lengthy period of time without significant dehydration or over cooking.

Figure 2:
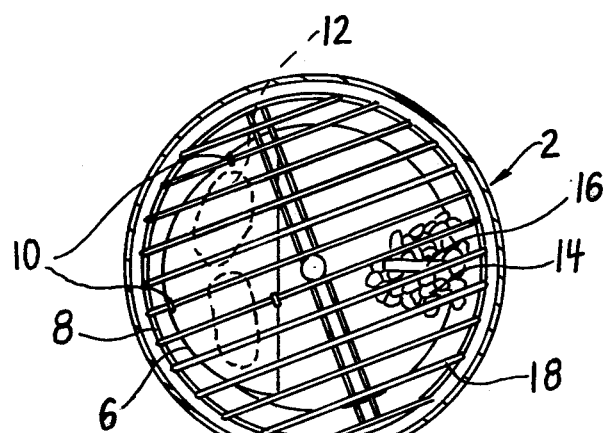
FIG. 2 is a cross sectional view of the food cooker illustrated in FIG. 1 taken along line 2—2.

FIG. 2 illustrates a cross-sectional view of the cooker in FIG. 1 taken along line 2—2 wherein the heat absorption cavity 6 is shown to have a semi-circular, top elevational shape. The radius of the cavity 6 is small enough to allow the cavity 6 to fit unobstructedly beneath the grill 8 of the cooker, but large enough such that the surface of the cavity will substantially encompass the largest piece of food which may be smoked. The length of the cavity 6 must be chosen with these same limitations in mind. The depth of the cavity should be sufficient to permit the cavity to house a substantial amount of water, but shallow enough to permit the cavity to fit unobstructedly under the grill 8 of FIG. 1.

Figure 3:
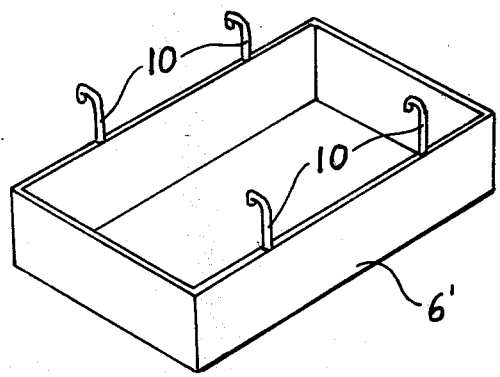
FIG. 3 is a perspective view of a rectangular embodiment of the heat absorption cavity of the invention.

FIG. 3 illustrates a rectangular embodiment 6' of the heat absorption cavity 6 of the invention. Its length, width, and depth are chosen with the same considerations as were, respectively, the length, radius and depth of the semi-circular cavity illustrated in FIG. 2. Both the heat absorption cavities of FIG. 2 and FIG. 3 may be made from any material which can withstand relatively high temperatures and which readily absorb heat. Ceramics and metals are two materials ideally suited for this purpose. Also, although the semi-circular embodiment of the heat absorption cavity 6 has been illustrated for usage in an spherical cooker, it could be used in a rectangular cooker, just as the rectangular embodiment 6' of the heat absorption cavity could be used in a semi-circular cooker assuming the cavity does not obstruct the operation of the grill. It is, however, an important feature of this invention that the cavity be configured as nearly as possible to provide the maximum heat barrier between the food and the ignited charcoal and to provide maximum water holding capacity while, at the same time fitting unobstructedly beneath the food supporting surfaces of the cooker.

The remaining FIGS., 4 through 8, are perspective views of various embodiments of the detachable connectors 10. While the connectors may take a variety of forms, each form is employed by placing a plurality of the connectors around the perimeter of the heat absorption cavity 6 so as to afford the cavity mechanical stability. It should be understood that each of these detachable connectors 10 can be advantageously used with most any shape of heat absorption means. The vertical length of each of the detachable connectors 10 illustrated in FIGS. 4 through 8 should be as short as possible so as to cause the suspended cavity 6, after installation, to be as close as possible to the above supporting grill 8. In practice, however, this length must be made long enough to permit the open downturned hook formed at the upper end of each detachable connector 10 to clear the horizontal bar member 18 (FIG. 2) of the grill 8 during installation of the heat absorption cavity 6. The detachable connectors 10 may be made of any material such as metal which is both rigid and capable of withstanding relatively high temperatures.

Figure 4:
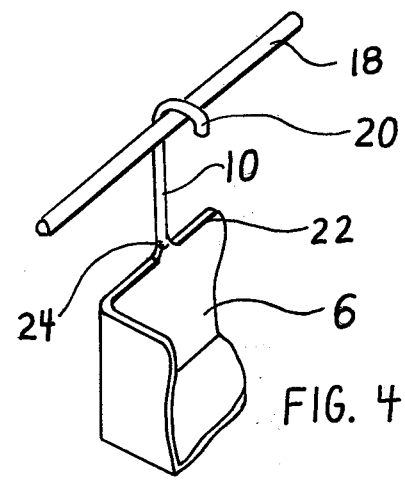
FIG. 4 is a perspective view of an intergrally affixed embodiment of a detachable connector of the invention.

FIG. 4 is a perspective view of an integrally affixed embodiment of the detachable connector 10 of the invention. An overturned open hook 20 is formed at the top of the detachable connector 10 for linking the detachable connector 10 to a horizontal bar member 18 of the grill 8. The lower end of the detachable connector 10 is joined to the upper edge 22 of the heat absorption cavity 6 by some type of permanent bond such as a weld joint 24.

Figure 5:
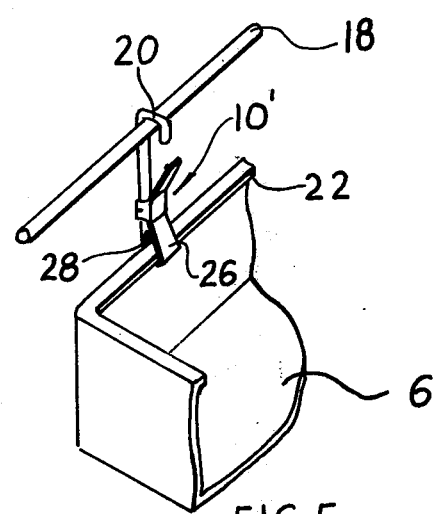
FIG. 5 is a perspective view of a lower releasable-clip embodiment of a detachable connector of the invention.

FIG. 5 is a perspective view of a lower releasable-clip embodiment 10' of the detachable connector of the invention. It is identical with the detachable connector 10 illustrated in FIG. 4 except that its lower end is releasably connected to the upper edge 22 of the heat absorption cavity 6 with a clip 26 held closed by a tension spring 28. This particular embodiment is distinctively advantageous in that very little additional length need be given to the detachable connector to permit its unobstructed installation.

Figure 6:
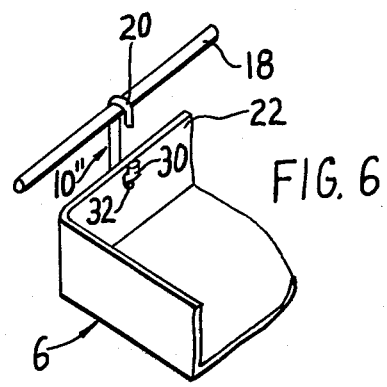
FIG. 6 is a perspective view of a lower releasable-hook embodiment of a detachable connector of the invention.

FIG. 6 is a perspective view of a lower releasable-hook embodiment 10" of the detachable connector of the invention. It is identical with the detachable connector illustrated in FIG. 4 except that its lower end is releasably connected to the upper edge 18 of the heat absorption cavity 6 by the insertion of an upturned lower hook 30 formed at the lower end of the detachable connector 10" in an aperture 32 provided just below the upper edge 22 of the heat absorption cavity 6. This particular embodiment is advantageous when the invention is to be adapted for use with a wide variety of grills making prediction of the spacing of the horizontal bar 18 members impossible. In such a case, this lower releasable hook embodiment of the detachable connector can pivot about its lower connection point with the cavity 6 to any non-vertical position such that it can better align with the horizontal bar member 18 to which the upper hook 20 is attached.

Figure 7A:
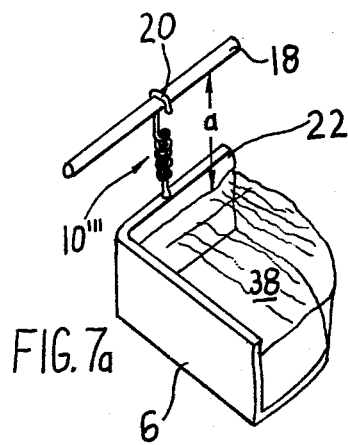
FIGS. 7(a) and 7(b) are perspective views of the integrally affixed embodiment of a detachable connector of the invention illustrated in FIG. 4 further including means to vary the length of the detachable connector in response to the amount of fluid contained within the heat absorption cavity.
Figure 7B:
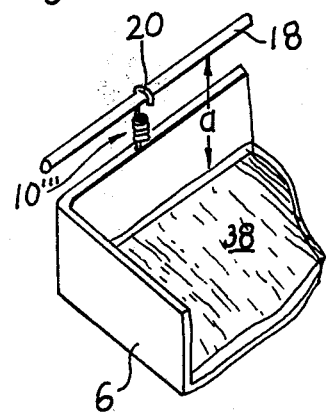

FIGS. 7(a) and 7(b) are perspective views of another integrally affixed embodyment 10''' of a detachable connector similar to that illustrated in FIG. 4 but further including means 34 to vary the length of the detachable connector 10 in response to the amount of fluid contained within the heat absorption cavity. More particularly the detachable connector 10''' includes a metal spring 36 inserted between and attached to the upper and lower ends of the detachable connector 10'''. The strength of the spring is chosen such that the length of the spring will vary in proportion to the amount of water contained within the heat absorption cavity 6. This will have the effect of maintaining the distance "a" between the elongated bar member 18 of the grill and the surface of the water 38 a substantially constant distance independent of the water level in the cavity 6 as is illustrated in FIG. 7(a) (cavity full with water) and FIG. 7(b) (cavity significantly emptied of water). This detachable connector embodiment is particularly useful where precise control must be maintained of the moisture and temperature surrounding the food.

Figure 8B:
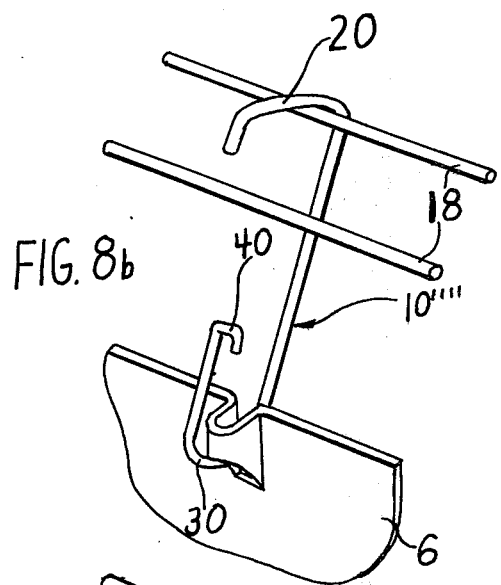
FIGS. 8(a) and 8(b) are perspective views of an especially easy to use embodiment of a detachable connector of the invention.
Figure 8A:
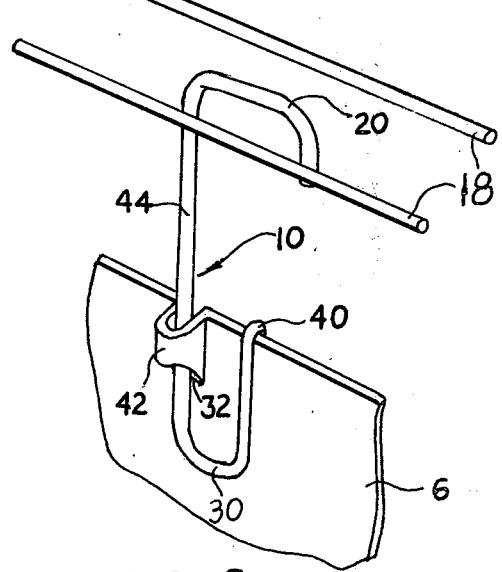

FIGS. 8(a) and 8(b) are perspective views of an especially easy to use embodiment 10'''' of the detachable connector of the invention essentially identical with the detachable connector 10'' of FIG. 6 except that a short downturned open hook 40 stems from the end of the lower upturned open hook 30 in a plane substantially perpendicular with the plane of the lower upturned open hook 30 and upper downturned hook 20. To use this embodiment, the open cavity 6 must be modified to include an inward depression 42 immediately above aperture 32 to form a track which constrains the center portion or stem of the detachable connector 10'''' to movement only in a plane perpendicular to the side wall 46 of the cavity 6 to which the connector 10'''' is attached.

In usage, the detachable connector 10'''' is first placed in the position illustrated in FIG. 8(a) by looping hook 40 over edge 22 of cavity 6 in preparation for the suspension of the cavity from the horizontal bar member 18 of the grill 8. As illustrated in FIG. 8a, the downturned open hook 20 may without obstructional interference pass through the spaces between the horizontal bar members 18 as the heat absorption cavity 1 is raised into a position closely beneath the grill 8. Then, the detachable connectors 10'''' is lifted and rotated clockwise one quarter of a turn and released to automatically engage the horizontal bar members 18 of the grill 8 as illustrated in FIG. 8(b).

Within the limits of compatability, various features shown in different figures may be combined with or substituted for one another. For example the food supporting surface 8 may be integrally attached to the heat absorption cavity 6 such that the combined surface 8 and cavity 6 could be substituted for the food supporting surface of a pre-existing enclosable food cooker to form a food smoker. These and other modifications are intended to be embraced within the spirit and scope of my invention.

I claim:

1. Apparatus for converting into a food smoker an enclosable food cooker having a food supporting surface formed from spaced horizontal bar members and having a section for generating heat, comprising:

(a) heat absorption means for substantially reducing the atmospheric temperature in the space immediately surrounding food placed on one area of the food supporting surface of the food cooker and for providing added moisture to the space surrounding the food, said heat absorption means containing a cavity means configured to form a heat barrier between the one area of the food supporting surface and the heat generator section, said cavity means includes an open top container for holding liquid vaporizable by heat generated by the heat generation section; and (b) suspension means for suspending said open topped container from the food supporting surface directly and closely beneath the food which is to be smoked, said suspension means includes a plurality of connector means for connecting said suspension means to the spaced horizontal bar members, each said connector means includes an elongated member, upper joinder means for detachably connecting the upper end of said elongated member to one of the horizontal bar members and lower joinder means for connecting the lower end of said elongated member to said open topped container.

2. Apparatus as defined in claim 1, wherein said lower joinder means is integrally connected with said open topped container.

3. Apparatus as defined in claim 1, wherein said heat absorption means includes an open top container, said open top container including a side wall containing an aperture, and wherein said lower joinder means includes an upturned open hook for removable insertion in said aperture.

4. Apparatus as defined in claim 1, wherein said heat absorption means includes an open top container, said open top container including a side wall having a lip formed on the uppermost portion thereof, and wherein said lower joinder means includes clip means for releasably engaging said lip.

5. Apparatus as defined in claim 1, wherein said upper joinder means includes a downturned open hook.

6. Apparatus as defined in claim 1, wherein said upper joinder means includes a clip.

7. Apparatus as defined in claim 1, further including compensation means connected between said upper and lower joinder means to vary the length of each elongated member in response to the amount of fluid contained with said open topped container.

8. Apparatus as defined in claim 7, wherein said compensation means includes a spring.

9. Apparatus as defined in claim 1, wherein said connector means is movable to a first self-maintainable position in preparation for the suspension of said heat absorption means from the horizontal bar members of the grill wherein said upper joinder means may without obstructional interference pass through the space between the horizontal bar members of the grill as said heat absorption means is relatively positioned closely beneath the grill, and wherein said connector means is further movable to a second position in final preparation for the suspension of said heat absorption means from the horizontal bar members of the grill wherein said upper joinder means will engage a horizontal bar member of the grill as said heat absorption means is subsequently lowered relative to the grill.

10. Apparatus as defined in claim 9, wherein said heat absorption means includes a container including at least one side wall having track confinement means therein for constraining said elongated member of said connector means for movement only in a plane perpendicular to said side wall, and wherein said upper joinder means includes a downturned open hook in a first plane, and wherein said lower joinder means includes both an upturned open hook in a plane parallel with said first plane and a shorter downturned open hook in a plane perpendicular with said first plane, said shorter downturned open hook stemming from the end of said upturned open hook not attached to said elongated member.

11. Apparatus for smoking food, comprising (a) an enclosable food cooker having a food supporting surface formed from spaced horizontal bar members and having a section for generating heat;

(b) heat absorption means for substantially reducing the atmospheric temperature in the space immediately surrounding food placed on one area of the food supporting surface of the food cooker and for providing added moisture to the space surrounding the food, said heat absorption means containing a cavity means configured to form a heat barrier between the one area of said food supporting surface and said heat generation section, said cavity means includes an open top container for holding liquid vaporizable by heat generated by said heat generation section; and (c) suspension means for suspending said open topped container from said food supporting surface directly and closely beneath the food which is to be smoked, said suspension means includes a plurality of connector means for connecting said suspension means to said spaced horizontal bar members, each said connector means includes an elongated member, upper joinder means for detachably connecting the upper end of said elongated member to one said horizontal bar member, and lower joinder means for connecting the lower end of said elongated member to said open topped container.

* * * * *